(12) United States Patent
Bullivant

(10) Patent No.: US 10,994,945 B2
(45) Date of Patent: May 4, 2021

(54) GRANULAR METERING SYSTEM

(71) Applicant: Plastrac Inc., Edgmont, PA (US)

(72) Inventor: Kenneth W. Bullivant, Chadds Ford, PA (US)

(73) Assignee: Plastrac Inc., Edgmont, PA (US)

( * ) Notice: Subject to any disclaimer, the term of this patent is extended or adjusted under 35 U.S.C. 154(b) by 0 days.

(21) Appl. No.: 17/022,820

(22) Filed: Sep. 16, 2020

(65) Prior Publication Data

US 2021/0078807 A1    Mar. 18, 2021

Related U.S. Application Data

(60) Provisional application No. 62/901,910, filed on Sep. 18, 2019.

(51) Int. Cl.
| | |
|---|---|
| *B65G 11/20* | (2006.01) |
| *B65G 47/19* | (2006.01) |
| *G01F 13/00* | (2006.01) |
| *B65G 53/14* | (2006.01) |

(52) U.S. Cl.
CPC ............ *B65G 47/19* (2013.01); *B65G 53/14* (2013.01); *G01F 13/001* (2013.01); *B65G 2812/1633* (2013.01); *B65G 2812/1683* (2013.01)

(58) Field of Classification Search
CPC ...... B65G 11/00; B65G 11/206; B65G 47/19; B65G 47/20; A01K 31/04
USPC ............ 198/523; 193/28, 30; D30/110, 111; 119/428, 432
See application file for complete search history.

(56) References Cited

U.S. PATENT DOCUMENTS

| | | | | |
|---|---|---|---|---|
| 872,462 | A * | 12/1907 | Schroeder | ...................... 198/360 |
| 1,539,559 | A * | 5/1925 | Hamachek | ............. B65G 69/00 |
| | | | | 198/536 |
| 1,719,788 | A * | 7/1929 | Snyder | ................... B65G 47/00 |
| | | | | 198/360 |
| 2,687,818 | A * | 8/1954 | Williams | ............. B65G 11/026 |
| | | | | 198/536 |
| 2,792,096 | A * | 5/1957 | Erickson | ................ B65G 69/00 |
| | | | | 193/17 |

(Continued)

FOREIGN PATENT DOCUMENTS

| | | |
|---|---|---|
| DE | 199223757 | 11/2000 |
| EP | 0678736 | 10/1995 |

(Continued)

*Primary Examiner* — Joseph A Dillon, Jr.
(74) *Attorney, Agent, or Firm* — Joseph E. Maenner; Petock & Petock, LLC

(57) ABSTRACT

An additive feeder assembly includes a supply reservoir having an outlet and an outlet tube having a first end in fluid communication with the outlet and a second end located vertically higher than the supply reservoir. An air stream transports a first granular material discharged from the supply reservoir and into the first end of the outlet tube to the second end of the outlet tube. A granular material distributor is in fluid communication with the second end of the outlet tube. The granular material distributor has a top end configured for attachment to a feed supply for a second granular material, a central portion located vertically below the top end and configured to mix the first granular material and the second granular material, and a bottom end configured for vertically discharging the mixed first granular material and second granular material.

6 Claims, 4 Drawing Sheets

(56) References Cited

U.S. PATENT DOCUMENTS

| | | | | |
|---|---|---|---|---|
| 2,940,573 | A * | 6/1960 | Schultz | B65G 69/0441 193/3 |
| 3,148,763 | A * | 9/1964 | Yasuhiro | F27B 21/00 193/28 |
| 3,458,237 | A | 7/1969 | Noe | |
| 3,516,531 | A * | 6/1970 | Bedeker | D21G 7/00 414/266 |
| 3,590,981 | A * | 7/1971 | Adrian | A01D 46/26 198/534 |
| 3,797,890 | A * | 3/1974 | Walters | B65G 53/06 406/33 |
| 4,225,033 | A * | 9/1980 | Fukagai | B65G 69/186 141/93 |
| 4,227,895 | A * | 10/1980 | Boon | B01D 45/10 96/240 |
| 4,352,569 | A * | 10/1982 | Krauss | B65D 88/742 366/107 |
| 4,485,973 | A * | 12/1984 | Ricciardi | B29B 7/60 239/659 |
| 4,569,596 | A | 2/1986 | Romanchik et al. | |
| 4,702,198 | A * | 10/1987 | Holyoak | A01K 31/14 119/432 |
| 5,104,229 | A | 4/1992 | Paul | |
| 5,127,439 | A * | 7/1992 | Stanchina | B65G 11/206 137/554 |
| 5,252,008 | A | 10/1993 | May, III et al. | |
| 5,791,830 | A | 8/1998 | Fort et al. | |
| 5,911,667 | A * | 6/1999 | Sanchis | B65G 69/16 193/3 |
| 6,007,236 | A | 12/1999 | Maguire | |
| 6,012,875 | A | 1/2000 | Goettelmann et al. | |
| 6,095,087 | A * | 8/2000 | Bloedorn | A01K 39/012 119/429 |
| 6,269,774 | B1 * | 8/2001 | Stewart | A01K 31/14 119/430 |
| 6,877,933 | B2 | 4/2005 | Ho et al. | |
| 6,892,909 | B1 * | 5/2005 | Hebert | A01C 7/081 111/174 |
| 6,973,896 | B2 * | 12/2005 | Smith | A01K 39/00 119/428 |
| 7,309,201 | B2 * | 12/2007 | McNaughton | B01J 8/003 414/160 |
| 7,540,260 | B2 * | 6/2009 | Rich | A01K 39/0113 119/429 |
| 7,650,985 | B2 * | 1/2010 | Day | B65G 11/206 198/532 |
| 8,016,116 | B2 * | 9/2011 | Schneider | B07B 4/08 209/139.1 |
| 8,092,070 | B2 | 1/2012 | Maguire | |
| 8,591,098 | B2 | 11/2013 | Kemp et al. | |
| 9,637,320 | B2 | 5/2017 | Moretto | |
| 9,694,995 | B2 * | 7/2017 | Haraway | B65G 69/188 |
| 9,702,103 | B2 * | 7/2017 | Wendorff | B65G 11/083 |
| 9,708,138 | B2 | 7/2017 | Veselov et al. | |
| 9,937,651 | B2 | 4/2018 | Zinski et al. | |
| 10,138,076 | B2 | 11/2018 | Maguire | |
| 10,179,708 | B2 | 1/2019 | Maguire | |
| 10,683,174 | B2 * | 6/2020 | Huff | B65G 11/206 |
| 2002/0185316 | A1 * | 12/2002 | Carlson | G01G 13/024 177/16 |
| 2005/0039816 | A1 | 2/2005 | Maguire | |
| 2005/0201199 | A1 * | 9/2005 | O'Callaghan | B01F 15/0202 366/141 |
| 2006/0096837 | A1 * | 5/2006 | Sanders | B65G 69/10 198/525 |
| 2010/0220549 | A1 | 9/2010 | Holdsworth | |
| 2011/0094720 | A1 * | 4/2011 | Wang | F28D 7/1607 165/161 |
| 2012/0085292 | A1 * | 4/2012 | Lush | A01K 31/08 119/431 |
| 2014/0182518 | A1 * | 7/2014 | Boehm | A01K 31/007 119/429 |
| 2016/0368721 | A1 * | 12/2016 | Haraway | B65G 11/206 |
| 2019/0127144 | A1 | 5/2019 | Lucas et al. | |
| 2019/0162098 | A1 * | 5/2019 | Vankan | B01F 5/0614 |
| 2020/0079590 | A1 * | 3/2020 | Paugh | B65G 11/206 |

FOREIGN PATENT DOCUMENTS

| | | |
|---|---|---|
| EP | 2939960 | 9/2017 |
| WO | WO2014013446 | 1/2014 |
| WO | WO2019029866 | 2/2019 |

* cited by examiner

GRANULAR METERING SYSTEM

BACKGROUND OF THE INVENTION

Field of the Invention

The present invention relates to a system for metering granules into a blending system.

Description of the Related Art

Prior art blending systems use one or more disc feeders to blend one or more granular additive components with a pelletized natural plastic resin main component. There are numerous similar competitive systems on the market which differ mainly in that they may use some type of auger feeder instead of disc feeders. The most common additive is color concentrate. These are pellets containing such a high concentration of pigment that they can impart color properties to the total blend when added at very small percentages. The main component thus makes up the majority of the blend and in many cases may constitute more than 98% of the blend. These systems are mounted to the material inlet of a plastic processing machine such as an injection molding machine or an extruder.

When a continuous supply of material is available at the inlet of these machines, they are known to accurately determine the total rate of material consumption by weight based on their operating speed which can be determined by electrical signal outputs. The simplest and most cost effective blending concept uses additive feeders which can meter each additive rate by weight corresponding to their desired blend percentage. Since the total throughput is controlled by the processing machine and the additive rates are metered, no feeder is required for the high rate main component. This can significantly reduce total system cost.

For this approach to work, the merging of the additive components and the main component must be done in a way which gives preference to the additives and also allows a sufficient amount of main component to flow in order to make up the balance of the blend flowing into the processing machine, such as extruder. This is normally accomplished with a baffle arrangement which retards the main component by causing it to flow laterally towards the process machine inlet while allowing the additives direct vertical access to the central region of the material flowing to the inlet.

In a common conventional version of this type of system, such as the Plastrac GS series, a box housing the baffle is mounted to the process machine inlet flange. In another common version, such as the Plastrac GF series, the baffle unit consists of a tubular structure rather than a box. In each case the main component flows by gravity into the baffle unit from above. The additive feeders are arranged radially around the box and supported by arms from the box. The additives flow down through angled tubular chutes leading to the area directly above the baffle unit outlet. In the tubular baffle unit implementation, the angled tubular chutes simultaneously serve as feeder support arms.

One problem with such systems arises in that, particularly in the case of large processing machines, the material inlet is elevated a substantial distance above the floor. This makes access to the additive feeders, which are located yet higher, difficult to reach and potentially hazardous.

Access to the additive feeders is required for cleaning and/or feeder component swap out when changing colors which may be a frequent occurrence. In addition it may also be necessary to clean out the tubular additive chutes. This is because stray fine particles are usually present in color concentrate and these particles stick to surfaces by electrostatic attraction. If these are not removed they can cause specks of a previous color to ruin the product for a long time after a color change over.

It would be beneficial to provide an additive feeder that can be located at ground level to facilitate cleaning and changeouts without having to climb to the top of the process machine, as well as an additive feeder discharge at the process machine that requires a minimum of maintenance, particularly between color changes.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a system to separate the metering of additives from a portion of the system handling the main component so that the additive metering portion can be located at floor for safe and convenient access. The system does not require cleaning of any element not located at floor level when color change over occurs. Additionally, the required transport of the additive stream to the inlet of the processing machine is nearly maintenance free and consumes little energy in order to be practical. Ideally the floor mounted portion of the system is compact and can be mounted on casters since the floor mounted system must be moved to create access for major maintenance of the process machine.

In an alternative embodiment, the present invention provides an additive feeder assembly comprising a supply reservoir having an outlet, an outlet tube having a first end in fluid communication with the outlet and a second end located vertically higher than the supply reservoir, and a means for transporting a first granular material discharged from the supply reservoir and into the first end of the outlet tube to the second end of the outlet tube. A granular material distributor is in fluid communication with the second end of the outlet tube. The granular material distributor has a top end configured for attachment to a feed supply for a second granular material, a central portion located vertically below the top end and configured to mix the first granular material and the second granular material, and a bottom end configured for vertically discharging the mixed first granular material and second granular material.

In another alternative embodiment, the present invention provides a granular material distributor comprising an outer housing having a top end portion;
an open bottom end portion, distal from the top end portion; and a vertical axis extending between the top end portion and the bottom end portion. A baffle box is disposed in the outer housing such that a space is provided between the baffle box and the outer housing. The baffle box comprises a central portion having an inlet, an upper portion located above the central portion with an outlet, and a lower portion located below the central portion and configured to gravity discharge granular material from the central portion out of the baffle box.

Also, the present invention provides a granular material distributor comprising a plenum chamber having a first area, an inlet opening upstream from the plenum and in fluid communication with the plenum chamber. The inlet opening has a second area such that the first area is at least 10 times larger than the second area. An air discharge portion is disposed vertically above the plenum chamber such that the air discharge portion has a laterally directed outlet opening. A screen is disposed between the plenum chamber and the air discharge portion. The screen has a mesh sized to retain granular material discharged into the plenum chamber from the inlet opening.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
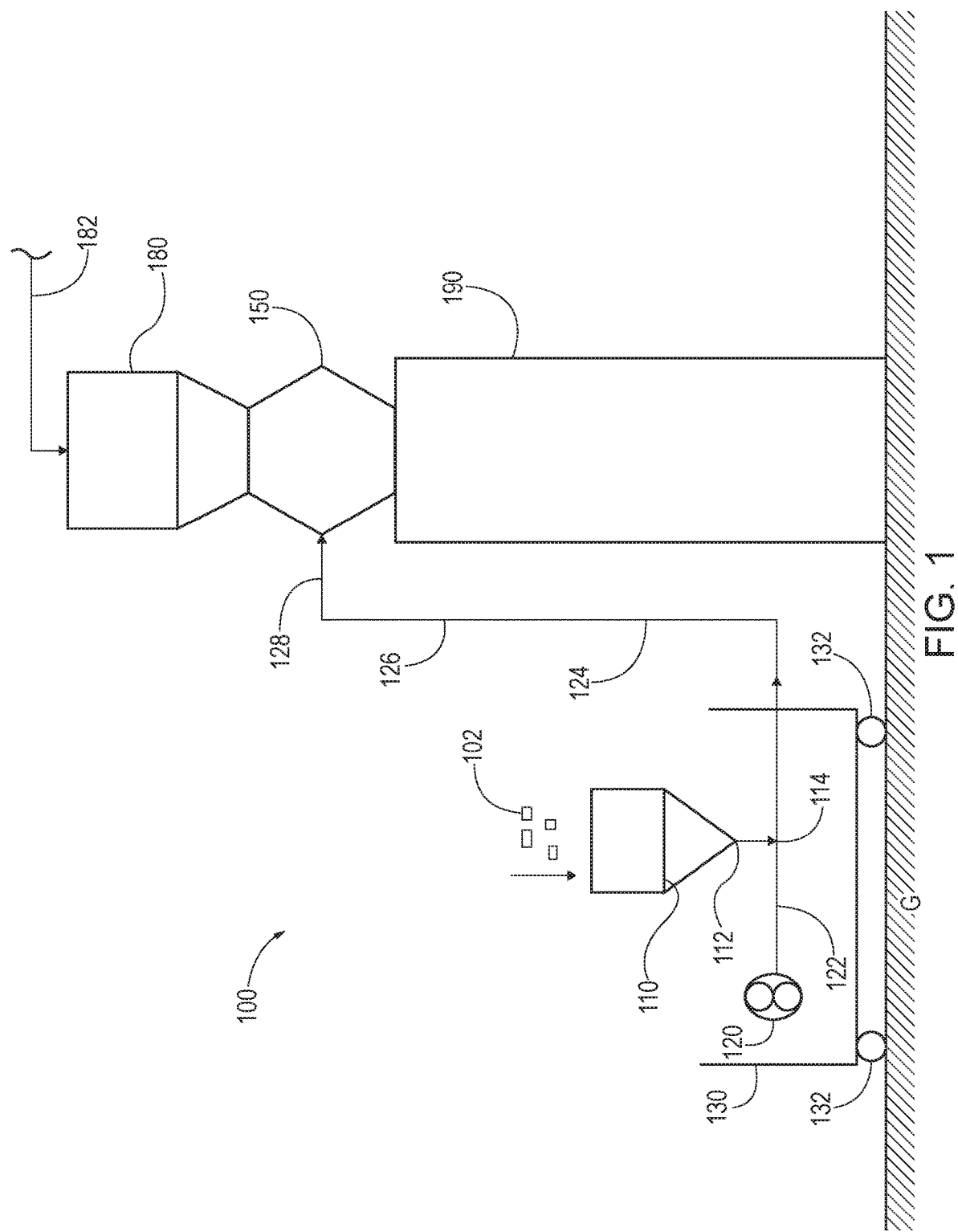
FIG. 1 is a schematic drawing of a granular metering system according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to the Figures, the present invention provides a system 100 for metering granular particles and conveying the particles vertically upward for mixing with a virgin, or primary material. In an exemplary embodiment, the granular particles can be colored pellets having approximate dimensions of between about 0.5 mm3 and about 1 mm3. The granular particles can be spherical, cubic, or randomly shaped. The particles and the primary material can both be polymers for use in forming or coating extruded material, such as, for example, continuously extruding lengths of plastic or coating electrical wiring or, alternatively, feeding an injection molding machine (not shown).

Referring to FIG. 1, an exemplary schematic drawing of system 100 is shown. System 100 is an additive feeder assembly comprising a supply reservoir 110 having an outlet 112. In an exemplary embodiment, supply reservoir 110 comprises a continuous metering device of granular material 102 and outlet 112 is a gravity outlet that discharges the granular material 102 into an outlet tube 122 that is in fluid communication with a means for transporting the granular material 102. While a single supply reservoir 110 is shown, those skilled I the art will recognize that more than one supply reservoir can be used. By way of example only, a first supply reservoir 110 can contain a colorant, while a second supply reservoir 110 can contain a solid lubricant material.

In an exemplary embodiment, the means for transportation the granular material 102 comprises an air flow generator 120 that includes a venturi 114. Air flow generator 120 generates air speeds sufficient to carry the granular material 102 vertically upwardly through outlet tube 122 to a first end 124 that is in fluid communication with the outlet of the air flow generator 120, then to a vertical portion 126 for discharge at a second end 128 vertically above supply reservoir 110.

Air flow generator 120 generates air speeds are sufficient to prevent the granular material 102 from adhering to the outlet tube 122. Additionally, outlet tube 122 has relatively smooth sides to prevent granular material 102 from lodging in crevices inside outlet tube 122.

Conventional venturis using high pressure compressed air from the factory central system are unaffordable for this application due to their high rate of air consumption combined with the requirement for continuous operation. The preferred type of venturi is one designed to use air at low pressure (<1 psi) which can be supplied by an electrically powered blower located on the cart.

An exemplary type of aire flow generator 120 for this application is a regenerative blower such as a Fuji VFC-220P-5T with an integral electric motor. Regenerative blowers (also called compressors) are also known as ring blowers, or side channel blowers. These units can operate continuously for more than five years and deliver clean air since they have no contacting parts requiring lubrication.

By way of example only, the venturi 114 and outlet tube 122 are small enough in diameter that a transport air velocity of 3000-4000 feet/minute can be maintained through the outlet tube 122 without requiring a larger blower, which would consume much more power. This velocity is required to keep the transported granular material 102 entrained in the air stream. Typical applications involving color concentrate and other minor additives can work with outlet tube 122 having a 1 inch inside diameter. The resulting air flow to maintain the required velocity is on the order of 25 SCFM.

A support cart or stand 130 is provided to support the one or more supply reservoirs 110 and air flow generator 120. Support cart 130 can be mounted on wheels 132 to allow for easy movement of cart 130 around a shop floor.

A granular material distributor 150 is in fluid communication with the second end 128 of the outlet tube 122. It is desired that granular material distributor 150 has a minimum height to reduce the total vertical clearance required to mix granular material 102 with a supply of natural material 104 (shown in FIG. 2). A low height granular material distributor 150 permits installations where ceiling height is limited.

Referring in detail to FIGS. 2-4, granular material distributor 150 has an outer housing 152 having a top end portion 154 and an open bottom end portion 156, distal from top end portion 154. Top end portion 154 is configured for attachment to hopper 180 (shown in FIG. 1) for a second granular material, such as natural material 104 provided via a feed supply 182, which can be a continuous feed supply.

Granular material distributor 150 also includes a center portion 157 that has a larger cross section than top end portion 154 and also bottom end portion 156. Top end portion 154 can also have a larger cross section than bottom end portion 156. A vertical axis 158 extends between top end portion 154 and bottom end portion 156.

In an exemplary embodiment, top end portion 154 is generally square, with a flange dimension of about 8" square and opening dimensions of about 4¼" square. Bottom end portion 156 also has a flange dimension of about 8" square and opening dimensions of about 2½" square.

A baffle box 160 is disposed in outer housing 152 such that a space is provided between baffle box 160 and outer housing 152 to allow for the flow of natural material 104 from hopper 180 around baffle box 160 and down to bottom end portion 156. As shown in FIG. 3, outer housing 152 can have a hexagonal cross section.

Baffle box 160 includes a plenum chamber, or central portion 162 having a granular material inlet 164 upstream of and in fluid communication with central portion 162. In an exemplary embodiment, central portion 162 has a generally circular cross section, forming a curved interior, and inlet 164 extends laterally or tangentially to central portion to set up a cyclone of air from blower 120 with granular material 102 transported upward to granular material distributor 150 and being forced against the wall of central portion 162. In an exemplary embodiment, central portion 162 has an inside diameter of about 2¾" and a cross sectional area of about 6 square inches. Inlet 164 has an inside diameter of about ⅞" and a cross sectional area of about 0.6 square inches, meaning that the cross sectional area of central portion 162 is at least about 10 times larger than the cross sectional area of inlet 164. This large difference in cross sectional areas helps to quickly reduce the speed of the air being blown out of inlet 164, resulting in the granular material 102 gravity falling out of the air stream and downward toward bottom end portion 156 of outer housing 152.

An air discharge, or upper, portion 166 is located vertically above the central portion 162 and has an outlet 168 that extends generally laterally relative to upper portion 162. Optionally, outlet 168 can include a filter to further filter air being discharged from baffle box 160. Outlet 168 extends outwardly of outer housing 152 for ultimate discharge to atmosphere. Outlet 168 is sized and located to allow for the exiting of air from inside baffle box 160 other than out the bottom of baffle box 160.

Upper portion 166 includes a first top surface 169 extending obliquely relative to the vertical axis 158. Optionally, upper portion 166 can also include a second top surface 170 that also extends obliquely relative to the vertical axis 158 and to the first top surface 169. First top surface 169 and second top surface 170 are configured to direct natural material 104 in the outer housing 152 away from baffle box 160.

First and second top surfaces 169, 170 form an attic defining upper portion 166 that serves as a duct to allow the transport air from tube 122 to be routed out of the baffle box 160 laterally via outlet 168. It is especially desired that air flow not exit baffle box 160 directly to the granular material 102 inside outer housing 152, but is instead ducted away via a route other than out the bottom or top of baffle box 160, such as via outlet 168.

While two top symmetrical surfaces 169, 170 are shown, those skilled in the art will recognize that upper portion 166 needs only to include a single obliquely aligned and asymmetrical top surface so that natural material 104 can readily gravity flow around baffle box 160. The use of only a single obliquely aligned top surface, however, would result in a somewhat higher box and would not disperse the additives as uniformly in the blended stream flowing into the processing machine as the disclosed two oblique top surfaces 169, 170.

A screen 172 extends between central portion 162 and upper portion 166. Screen 172 has a mesh sized to prevent solid particles, such as granular material 102, that enters the inlet 164 from entering into upper portion 166. Screen 172, however, does not get clogged by granular material 102 because the much larger open area between central portion 162 and upper portion 166 than the cross section of outlet 168 reduces air velocity below that required to lift the granular material 102. A great advantage of this design is that all surfaces are scrubbed by the transport air or by impingement of additive granular material 102 so that color changes do not require cleaning of the hose or baffle box components.

Further, the present design allows additives such as granular material 102 to be merged with the main component, such as natural material 104. In order for this to occur, the transport air flow must be separated from the transported granular material 102 and allowed to exit the system. This is done in a way that generates little resistance to air flow, since significant back pressure would require a much larger, power hungry blower to maintain the necessary air velocity.

Figure 2:
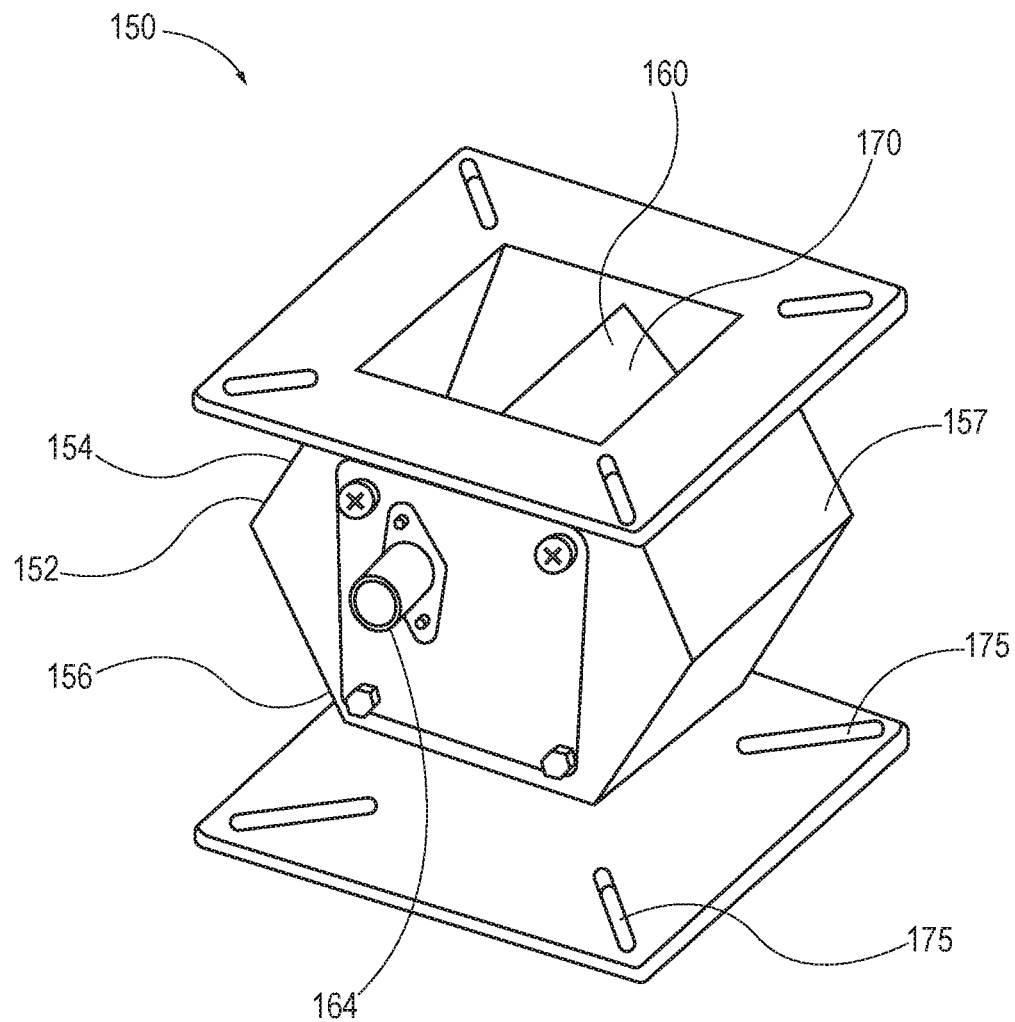
FIG. 2 is a perspective view of an outer housing with baffle box used with the system shown in FIG. 1.
Figure 3:
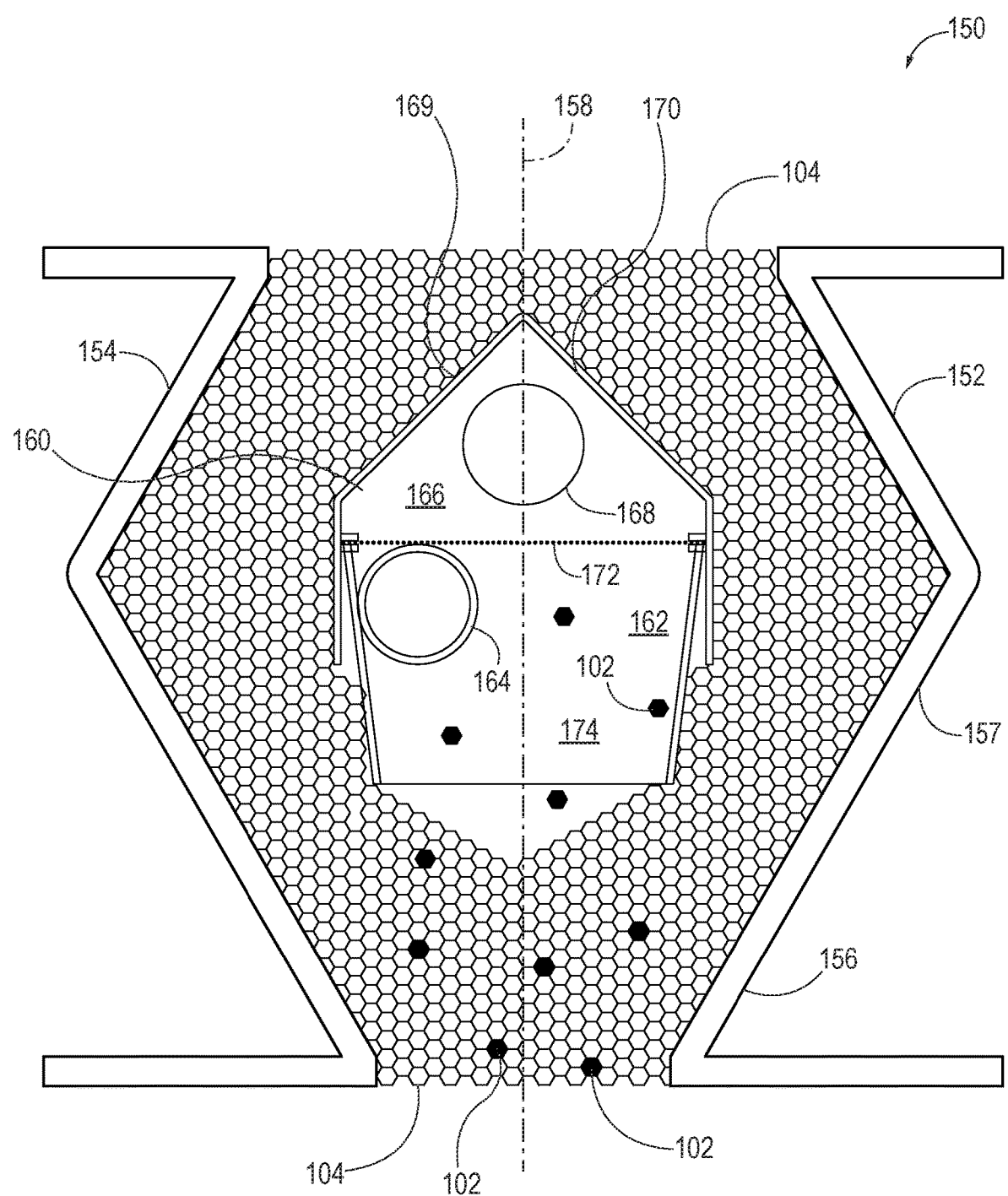
FIG. 3 is a side elevational view, in section, of the outer housing with baffle box used with the system shown in FIG. 2.
Figure 4:
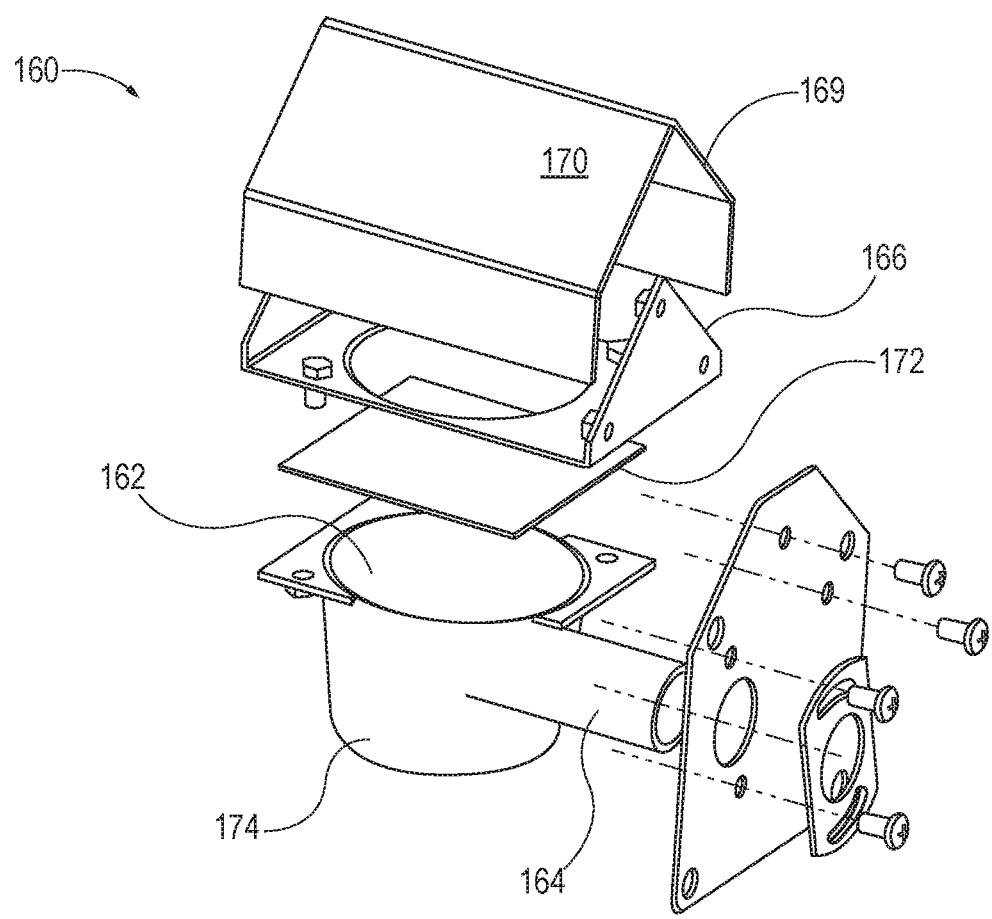
FIG. 4 is an exploded perspective view of the outer housing with baffle box used with the system shown in FIG. 2.

A lower portion 174 is located below the central portion 162 and is configured to gravity discharge granular material 102 from the central portion 162 out of the baffle box 160 and is configured to mix granular material 102 with natural material 104 flowing around baffle box 160 in center portion 157 of outer housing 152. Lower portion 174 can be generally frustoconical in shape, with a larger diameter at central portion 162. Lower portion 174 extends concentrically within bottom end portion 156 along the vertical axis 158 such that lower portion 174, which forms a particle discharge portion such that a bottom opening in bottom end portion 156 of outer housing 152, is disposed vertically below and concentric with the discharge portion. As shown in FIG. 2, lower portion 174 can be flanged with through openings 175 to allow for releasable connection to a processing machine 190, shown in FIG. 1.

The characteristics of granular material distributor 150 described above are desirable because in a typical application natural material 104 is supplied by the customer's central conveying system vacuum receiver (not shown) stacked on top of a surge hopper large enough to supply the process for a considerable period of time.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A granular material distributor comprising:
    an outer housing having:
       a top end portion;
       an open bottom end portion, distal from the top end portion; and
       a vertical axis extending between the top end portion and the bottom end portion;
    and
    a baffle box disposed in the outer housing such that a space is provided between the baffle box and the outer housing, the baffle box comprising:
       a central portion having an inlet;
       an upper portion located above the central portion and having an outlet; and
       a lower portion located below the central portion and configured to gravity discharge granular material from the central portion out of the baffle box wherein the outer housing has a center portion disposed between the top end and the bottom end, wherein the center portion has a larger cross-section than the bottom end.

2. The granular material distributor according to claim 1, wherein the upper portion comprises a first top surface extending obliquely relative to the vertical axis.

3. The granular material distributor according to claim 2, wherein the upper portion further comprises a second top surface extending obliquely relative to the vertical axis and to the first top surface.

4. The granular material distributor according to claim 1, further comprising a screen extending between the central portion and the upper portion, wherein the screen has a mesh sized to prevent solid particles entering the inlet from entering into the upper portion.

5. The granular material distributor according to claim 1, wherein the lower portion extends concentrically within the bottom end portion along the vertical axis.

6. A granular material distributor comprising:
    an outer housing having:
    a top end portion;
    an open bottom end portion, distal from the top end portion; and
    a vertical axis extending between the top end portion and the bottom end portion; and
    a baffle box disposed in the outer housing such that a space is provided between the baffle box and the outer housing, the baffle box comprising:
    a central portion having an inlet;
    an upper portion located above the central portion and having an outlet; and
    a lower portion located below the central portion and configured to gravity discharge granular material from the central portion out of the baffle box;
    wherein the central portion comprises a curved interior;
    wherein the inlet extends generally tangentially to the curved interior.

* * * * *